United States Patent Office 3,554,764
Patented Jan. 12, 1971

3,554,764
FREEZE-THAW RESISTANT FLOUR AND STARCH THICKENER BLEND
David J. Yoder, Newburgh, Ind., and Maurice W. Bugg, Henderson, Ky., assignors to General Foods Corporation, White Plains, N.Y., a corporation of Delaware
No Drawing. Filed Dec. 21, 1967, Ser. No. 692,302
Int. Cl. A23l 1/14, 1/04, 1/40
U.S. Cl. 99—101                                    13 Claims

ABSTRACT OF THE DISCLOSURE

A food product having improved freeze-thaw stability is prepared using a thickening mixture containing pregelatinized wheat flour, and/or starches, an edible gum and sodium stearyl fumarate. The product is prepared by simple, dry blending of the ingredients, eliminating the need to chemically modify the starch or flour.

BACKGROUND OF THE INVENTION

This invention relates to the use of starches or flours and combinations thereof as thickening agents, more particularly, it relates to a product with improved freeze-thaw stability achieved by the addition of an improved thickening agent which is made by the simple process of dry blending the starch or flour with ingredients which substantially enhance the desired properties.

The use of starch or flour as a thickening agent has long been known in the art. Common uses of the starches and/or flours include thickening of soup mixes or gravies to give body to the product. Addition of starches as thickeners in packaging jelled products in the canning industry and in the frozen food industry is also known.

The use of starches and flours as thickening agents have presented several long recognized problems. Gelatinized starches used as thickeners in precooked foods have been known to impart an undesirable stringiness to the texture of the foods.

At high temperatures the starch mixtures have been known to break down resulting in separation of absorbed water from a previously homogeneous mix. Weeping and syneresis in thickeners at room temperature and particularly after freezing and thawing have long been a problem.

To date, attempts to overcome the deficiencies inherent in the use of starches as thickening agents have been directed to chemically modifying starches by such means as crossbonding, etherification, esterification or phosphation. While chemical modification of starch characteristics has been generally successful, this approach necessarily involves costly, chemical wet processing.

SUMMARY OF THE INVENTION

It has been discovered that a thickening agent consisting primarily of starches and/or flours, hereafter referred to as farinaceous material, offering the advantages of chemically modified thickening agents can be prepared by dry blending pregelatinized farinaceous material with certain key ingredients, namely, an edible gum and sodium stearyl fumarate.

The resultant dry blend when used as a thickener offers the advantages of a chemically modified thickening agent without the disadvantage of having to subject the farinaceous material to costly and time consuming chemical processing.

The thickener of this invention has a high absorption capacity and when mixed with liquids and cooked results in a product with a desirable, smooth texture. There is little tendency for the product to break down at high temperatures, thus, when used as a thickener for precooked foods it offers improved eating characteristics. The stringiness associated with gelatinized starches is reduced and the tendency toward gel formation and water separation are eliminated. The reduction of heat sensitivity may be particularly useful in preparing a thickener for canned goods which are to be retorted.

The product of this invention when used as a thickener for frozen gravies or as a thickener for frozen foods imparts freeze-thaw resistance to the foods. Weeping and syneresis after thawing are eliminated.

The use of the term thickener or thickening agent is not to be construed as limiting the utility of the invention to gravies or packing gels. Rather, it is to be construed broadly as a constituent which may be added to a food product in order to supply body to the final product. In this regard, the product of this invention is useful in preparing a variety of items such as tomato sauces, soups, fruit fillings, gravies and custard type pudding.

DESCRIPTION OF THE PREFERRED EMBODIMENT

The product of this invention is basically a blend of farinaceous material, an edible gum and sodium stearyl fumarate. While other ingredients may be added when preparing specific blends of the product for specific uses, such as constituents for flavoring or coloring, these other ingredients do not add to or substract from the basic discovery. The farinaceous material is the major component of the dry mix and the moisture content of the mix is less than 10% and preferably less than about 7%.

An edible gum at a level of 0.5 to 10.0 percent is necessary. While the use of gums as stabilizers and thickeners has long been known, and the fact that gums are known to impart a degree of freeze-thaw stability to some products, the degree of stability achieved in the product of this invention is far greater than that which can be attributed to a gum alone or a gum in combination with a farinaceous material. While all edible gums have not been tested, results of experiments show that basically all edible gums can be useful in the product of this invention and it is to be understood that the term edible gum is further limited to hydrophylic gums. The preferred gums are generally vegetable gums and the most preferred of these is guar gum. However, it has been found that carboxymethyl cellulose (CMC) among other non-vegetable gums is also a preferred gum. It has been found that the gums are most effective when used at a level of about 3.0 to 8.0 percent. While some degree of improvement is to be seen when using the gums at a level of less than 1.0 percent the effect is minimal. Also, when the level of gum is increased beyond 10 percent, some additional improvement may be obtained, but not in relation to the additional gum added. All of the percentage levels of the gums referred to are on a weight of dry mix basis.

The use of sodium stearyl fumarate is essential. Sodium stearyl fumarate is presently sold under the trade name of "Pruv" and has been described in two recent publications, the March 1966 issue of Food Engineering and the February 1966 issue of Cereal Science Today, vol. II, No. 2. In the aforementioned articles the properties of sodium stearyl fumarate (NaSF) are described and it is said to be useful in combination with starch to prepare stronger, more cohesive doughs. NaSF is also said to be useful in conditioning and softening the dough. It was theorized that the starch was conditioned by the NaSF complexing with the amylase fraction. It was further stated that NaSF can increase the swollen granule size and water holding capacity and curb retrogradation.

However, it was found that the use of NaSF and a farinaceous material by themselves did not result in a thickener with the desired freeze-thaw stability. Tests were run using 6 percent solutions of corn starch, corn starch+2 percent NaSF and what flour+2 percent NaSF in which the material was cooked, autoclaved, cooled, frozen and then thawed. All of the resultant solutions exhibited significant gel formation and water separation.

Additional tests were run which show that the addition of a gum alone, or NaSF alone, before or after cooking the farinaceous material do not yield a thickener with the freeze-thaw stability of the product of this invention. It is the presence of the gum and NaSF together with the farinaceous material that yield a product with the enhanced properties of the product of this invention.

It has been found that NaSF is useful at levels of about 0.5 to 6.0 percent by weight of the dry product. The preferred level of NaSF being from 1.0 to 4.0 percent and the most preferred level is 2.0 percent.

Unexpectedly, it was discovered that the synergistic effect of a gum and NaSF in combination with a major percentage of a farinaceous material is most effective when the farinaceous material is precooked and dried before the gum and NaSF are added. The precooking is accomplished on a Wenger extruder type cooker and the cooked farinaceous material is highly gelatinized. While precooking the farinaceous material before adding the gum and NaSF is most effective, it has been found that the NaSF may be added in some instances prior to the cooking step. Thus a mixture of tapioca starch and NaSF at a 2 percent level may be cooked, dried, and ground, and a gum such as CMC may then be blended in at a level of about 5 percent, or the tapioca starch may be cooked, dried, and ground, and the NaSF and CMC blended in together. However, the gum is always added after cooking and drying the farinaceous material as it deteriorates if subjected to the cooking operation.

The usefulness and desirability of the product of this invention is illustrated by the following examples.

EXAMPLE I

Wheat flour was precooked in a Wenger type cooker such that the flour was highly gelatinized on discharge from the cooker. The gelatinized flour was then dried conventionally and ground into a powder.

A dry blend of 93 percent precooked wheat flour, 5 percent guar gum and 2 percent Pruv was then made by mixing the ingredients in a ribbon blender for about 5 minutes, or until a homogeneous mix was obtained.

The resultant mix was used to thicken a commercially available beef broth. It was added to the broth at a 6 percent concentration and allowed to cook in the broth at about 190° F. for 10 minutes. The resulting gravy was then cooled until frozen and held in a frozen state overnight. The gravy was then allowed to thaw and was tested by visual inspection and by centrifugation.

Visually, the texture was found smooth and an absence of gelling was observed. There was no sign of liquid or fat separation.

A spin test was run on an International (Type SB–100) centrifuge. After 20 minutes at 2000 r.p.m. the centrifuge tubes were inspected and it was found that 0 percent of water settled out.

No separation of water on spin test (0 percent) is the most preferred rating as shown by the following table:

Spin Test Results

| Percent water separation: | Rating of freeze-thaw stability: |
|---|---|
| 0% | Excellent. |
| Less than 25% | Acceptable. |
| 25%–50% | Some freeze-thaw stability, but not acceptable. |
| Greater than 50% | Poor—unacceptable. |

EXAMPLE II

A blend of 93 percent precooked tapioca starch, 5 percent guar gum and 2 percent Pruv was prepared and tested as described in Example I. The texture and freeze-thaw stability were also excellent, but the gravy was not as cloudy and had less flavor than the gravy in Example I. This is explained by the natural clarity and blandness associated with tapioca starch as compared to wheat flour and shows that advantage can be taken of the specific properties of the starch used in the product of this invention. Similarly, it has been found that advantage can be taken of the specific gum used, e.g. tragacanth gum, giving a smoother texture than guar gum.

EXAMPLE III

A blend of 93 percent farinaceous material, 5 percent guar gum and 2 percent Pruv was prepared and tested as in Examples I and II. The farinaceous material consisted of equal parts of precooked wheat flour and tapioca starch by weight. Once again, the texture and freeze-thaw stability were found to be excellent. The clarity and flavor of the product was about mid-way between the same properties of the product prepared in Examples I and II, again showing that advantage of the specific properties of the starches and flour can be taken by blending several starches, flours or cereal grains.

EXAMPLE IV

A blend of 92 percent precooked wheat flour, 5 percent CMC and 3 percent Pruv was prepared and tested as in Example I. Again the resultant product was of excellent texture and stability.

EXAMPLE V

A gravy was prepared using the flour mix of Example I. Instead of adding the flour mix to a broth, the following ingredients were used to prepare a gravy:

| Item: | Percent by weight of mix |
|---|---|
| Water | 78.8 |
| Butter | 9.7 |
| Four mix of Ex. I | 4.9 |
| Kitchen Bouquet | 4.9 |
| Beef bouillon cube | 1.7 |

The procedure followed was to melt the butter in a frying pan and blend in the flour mix to form a smooth paste. The bouillon cube was then dissolved in boiling water and the liquid was gradually added to the paste, stirring constantly. The resultant mixture was cooked until it was bubbling and of desired thickness at which point the Kitchen Bouquet was added and the mixture stirred until a uniform color was obtained. The product was then cooled to room temperature and frozen in a glass jar at 0° F.

Upon thawing, the gravy was found to be of good consistency showing no signs of liquid or fat separation. Even after a second freeze-thaw cycle the gravy maintained its original qualities.

EXAMPLE VI

A mixture of 98 percent tapioca starch and 2 percent Pruv were processed in a Wenger type cooker, dried and ground. The mixture of gelatinized starch and Pruv was then dry blended at a 95 percent level with 5 percent guar gum in a ribbon blender for about 5 minutes. The resultant starch mixture was then used in preparation of a custard type pudding. Ingredients for the pudding were as follows:

| Item: | Weight percent in mix |
|---|---|
| Egg yolk | 6.0 |
| Flour Mix (prepared as above) | 3.0 |
| Milk | 79.8 |
| Sugar | 10.4 |
| Salt | 0.15 |
| Vanilla | 0.65 |

A small amount of the cold milk was mixed with the egg yolk and a second small amount of the cold milk was mixed with the dry ingredients. The remainder of the milk was heated to 158° F. and then added to the mixture of milk and dry ingredients in a double boiler. The mixture in the double boiler was heated for 10 minutes at 185° to 203° F. with constant stirring and then slowly added (with stirring) to the cold milk and egg yolk. The final mix was then heated in a double boiler, with constant stirring, for 10 minutes at 185° to 194° F. The mix was then poured into cans, cooled to room temperature and the cans sealed. The product was then frozen in the cans. Upon thawing the custard-type pudding exhibited no syneresis.

EXAMPLE VII

The flour mix of Example I was used to make a tomato sauce having the following ingredients:

| Item: | Percent by weight in mix |
|---|---|
| Water | 60.7 |
| Tomato paste | 21.9 |
| Onions | 8.8 |
| Flour mix | 3.0 |
| Soy oil | 2.9 |
| Salt | 1.5 |
| Sugar | 0.9 |
| Seasoning | 0.3 |

The dry ingredients were dry blended. Then the tomato paste, onions in ground state, soy oil and half of the water were mixed together and brought to a boil, stirring constantly. Upon reaching a boil the rest of the water was added and then the dry ingredients were mixed into the liquid. The resultant mix was brought to a boil and allowed to simmer at about 190° F. for 5 minutes. The tomato sauce was then poured into containers and frozen. Upon thawing the sauce was found to have a very desirable texture and exhibited no syneresis.

The foregoing examples are offered by way of illustration to show the usefulness of the product of this invention and are not to be construed as limiting the scope of the invention which is described in the appended claims.

What is claimed is:

1. A dry mix for use as a thickening agent comprising sodium stearyl fumarate, an edible gum and pregelatinized farinaceous material; the sodium stearyl fumarate being present at a level of from 0.2 to 6.0 percent by weight of the mix, the edible gum being present at a level of from 0.5 to 10.0 percent by weight of the mix, the pregelatinized farinaceous material being present as a major component by weight of the dry mix, and the moisture content of the mix being less than 7.0 percent.

2. The product of claim 1 wherein the level of sodium stearyl fumarate is from 1.0 to 4.0 percent by weight of the mix.

3. The product of claim 1 wherein the level of edible gum is from 3.0 to 8.0 percent by weight of the mix.

4. The product of claim 1 wherein the edible gum is carboxymethyl cellulose.

5. The product of claim 1 wherein the edible gum is guar gum.

6. The product of claim 1 wherein the pregelatinized farinaceous material is wheat flour.

7. The product of claim 1 wherein the pregelatinized farinaceous material is tapioca starch.

8. The product of claim 1 wherein the pregelatinized farinaceous material is a mix consisting of wheat flour and tapioca starch.

9. The product of claim 1 wherein the sodium stearyl fumarate is present at a level of from 1.0 to 4.0 percent by weight of the mix and the edible gum is present at a level of from 3.0 to 8.0 percent by weight of the mix.

10. A food product selected from the group consisting of tomato sauces, soups, fruit fillings, gravies and custard type pudding containing the composition of claim 1 in sufficient quantity to impart free-thaw stability to said product.

11. The product of claim 10 which is in a frozen state.

12. A method of preparing a dry mix suitable for use as a thickener comprising gelatinizing a farinaceous material, drying the gelatinized farinaceous material, subdividing the gelatinized farinaceous material into a powder and blending the gelatinized farinaceous material, an edible gum and sodium stearyl fumarate to obtain a homogenous mix; the level of the gelatinized farinaceous material being a major component of the dry mix, the level of sodium stearyl fumarate being from 0.2 to 6.0 percent by weight of the mix and the level of edible gum being from 0.5 to 10.0 percent by weight of the mix.

13. The method of claim 12 wherein the sodium stearyl fumarate is added prior to gelatinizing the farinaceous material.

References Cited

UNITED STATES PATENTS 3,343,964   9/1967   Thomas _____ 99—92

OTHER REFERENCES

Globe, E. F., et al., Effects of Irish Moss Extractive on Wheat-Flour Products, Cereal Science Today, July 1957, pp. 159–162.

RAYMOND N. JONES, Primary Examiner

J. M. HUNTER, Assistant Examiner

U.S. Cl. X.R.

99—124, 139, 144